United States Patent
Smith et al.

(10) Patent No.: US 12,445,537 B2
(45) Date of Patent: *Oct. 14, 2025

(54) SCHEDULER FOR TRANSACTION PROCESSING SYSTEM, AND SYSTEM INCORPORATING SUCH SCHEDULER

(71) Applicant: Games Global Operations Limited, Douglas (IM)

(72) Inventors: Grant Michael Smith, Union Mills (IM); Scott Xavier Dukes, KwaZulu-Natal (ZA); Matthew John Harris, Berkhamsted (GB)

(73) Assignee: Games Global Operations Limited, Douglas (IM)

( * ) Notice: Subject to any disclaimer, the term of this patent is extended or adjusted under 35 U.S.C. 154(b) by 170 days.

This patent is subject to a terminal disclaimer.

(21) Appl. No.: 18/523,143

(22) Filed: Nov. 29, 2023

(65) Prior Publication Data
US 2025/0175538 A1 May 29, 2025

(51) Int. Cl.
 *H04L 67/63* (2022.01)
 *G06F 9/50* (2006.01)

(52) U.S. Cl.
 CPC ............ *H04L 67/63* (2022.05); *G06F 9/5083* (2013.01)

(58) Field of Classification Search
 CPC ....... H04L 67/63; G06F 9/5083; G06F 9/5072
 See application file for complete search history.

(56) References Cited

U.S. PATENT DOCUMENTS

| | | |
|---|---|---|
| 7,490,153 B1 | 2/2009 | Krishnan |
| 8,956,220 B2 | 2/2015 | Melton |
| 9,098,329 B1 * | 8/2015 | Shepherd ............... G06Q 10/06 |
| 9,286,766 B2 | 3/2016 | Igesund |

(Continued)

FOREIGN PATENT DOCUMENTS

WO 2023193971 A1 10/2023

OTHER PUBLICATIONS

"Architecting a Highly Available Serverless, Microservices-Based Ecommerce Site", Jul. 15, 2021 (Jul. 15, 2021), XP093257148, Retrieved from the Internet: URL:https://aws.amazon.com/blogs/architecture/architecting-a-highly-available-serverless-microservices-based-ecommerce-site/.

(Continued)

*Primary Examiner* — Caroline H Jahnige
(74) *Attorney, Agent, or Firm* — McDonnell Boehnen Hulbert & Berghoff LLP

(57) ABSTRACT

An implementation may involve: receiving, by a web site, selection of a server application, wherein the server application is associated with a path, wherein the path includes a set of steps, wherein the set of steps is associated with program logic to perform a set of functions; receiving, by an application launcher, a request on behalf of a client device; determining, by the application launcher, the server application based on the request, and also based on metadata that relate to the server application and an operator of the web site; providing, by the application launcher, a client application to the client device, the client application configured to interact with the server application; executing, by an orchestrator, the path, wherein at least some of the set of steps include interaction with an external service, wherein a context of the execution is written in a database between execution of some of the steps.

20 Claims, 9 Drawing Sheets

(56) References Cited

U.S. PATENT DOCUMENTS

| | | | |
|---|---|---|---|
| 9,685,043 B2 | 6/2017 | Naicker | |
| 9,722,927 B2 | 8/2017 | Zhang | |
| 10,171,567 B2 | 1/2019 | Huang | |
| 10,269,220 B2 | 4/2019 | Harpur | |
| 10,282,689 B1* | 5/2019 | Johnston | G06Q 10/103 |
| 10,749,992 B2 | 8/2020 | Gowda | |
| 10,798,187 B2 | 10/2020 | Mullender | |
| 10,824,981 B2 | 11/2020 | Koutyrine | |
| 10,950,084 B2 | 3/2021 | Watkeys | |
| 10,951,691 B2 | 3/2021 | Mishra | |
| 11,005,708 B1 | 5/2021 | Gheorghe | |
| 11,356,525 B2 | 6/2022 | Miedema | |
| 11,379,461 B2 | 7/2022 | Raman | |
| 11,467,858 B2* | 10/2022 | Liguori | G06F 9/54 |
| 11,489,738 B2 | 11/2022 | Palladino | |
| 11,577,162 B2 | 2/2023 | Slabbert | |
| 11,651,653 B2 | 5/2023 | Ross | |
| 11,669,594 B2 | 6/2023 | Gibb | |
| 2003/0069055 A1 | 4/2003 | Moody | |
| 2004/0107168 A1 | 6/2004 | Millner | |
| 2005/0215304 A1 | 9/2005 | Moshal | |
| 2006/0079331 A1 | 4/2006 | Moshal | |
| 2006/0121968 A1 | 6/2006 | Daniel | |
| 2006/0189381 A1 | 8/2006 | Daniel | |
| 2006/0194628 A1 | 8/2006 | Novellie | |
| 2006/0229949 A1 | 10/2006 | Moshal | |
| 2006/0287097 A1 | 12/2006 | Moshal | |
| 2007/0063443 A1 | 3/2007 | Moshal | |
| 2007/0093297 A1 | 4/2007 | Moshal | |
| 2007/0197282 A1 | 8/2007 | Moshal | |
| 2007/0213121 A1 | 9/2007 | Moshal | |
| 2007/0225057 A1 | 9/2007 | Moshal | |
| 2008/0018049 A1 | 1/2008 | Hebden | |
| 2008/0045288 A1 | 2/2008 | Moshal | |
| 2008/0076501 A1 | 3/2008 | Mares | |
| 2008/0090632 A1 | 4/2008 | Kumar | |
| 2008/0090662 A1 | 4/2008 | Verardi | |
| 2008/0176618 A1 | 7/2008 | Toompere | |
| 2008/0214259 A1 | 9/2008 | Novellie | |
| 2009/0023490 A1 | 1/2009 | Moshal | |
| 2009/0093296 A1 | 4/2009 | Gerson | |
| 2009/0098920 A1 | 4/2009 | Toompere | |
| 2009/0124352 A1 | 5/2009 | Gerson | |
| 2009/0286586 A1 | 11/2009 | Heymann | |
| 2009/0318231 A1 | 12/2009 | Lange | |
| 2009/0325688 A1 | 12/2009 | Naicker | |
| 2010/0052255 A1 | 3/2010 | Naicker | |
| 2010/0167808 A1 | 7/2010 | Moshal | |
| 2010/0210362 A1 | 8/2010 | Toompere | |
| 2011/0028202 A1 | 2/2011 | Naicker | |
| 2012/0178518 A1 | 7/2012 | Moshal | |
| 2013/0023324 A1 | 1/2013 | Lange | |
| 2013/0090164 A1 | 4/2013 | Moshal | |
| 2013/0276101 A1 | 10/2013 | Rautenbach | |
| 2013/0276102 A1 | 10/2013 | Rautenbach | |
| 2013/0276103 A1 | 10/2013 | Rautenbach | |
| 2013/0290178 A1 | 10/2013 | Masie | |
| 2014/0289107 A1 | 9/2014 | Moshal | |
| 2014/0310117 A1 | 10/2014 | Moshal | |
| 2015/0119129 A1 | 4/2015 | Igesund | |
| 2015/0126264 A1 | 5/2015 | Igesund | |
| 2015/0141115 A1 | 5/2015 | Vermaak | |
| 2015/0170460 A1 | 6/2015 | Marais | |
| 2015/0221162 A1 | 8/2015 | Peters | |
| 2015/0248811 A1 | 9/2015 | Wortmann | |
| 2015/0324777 A1 | 11/2015 | Moshal | |
| 2015/0358235 A1 | 12/2015 | Zhang | |
| 2015/0381493 A1 | 12/2015 | Bansal | |
| 2016/0203671 A1 | 7/2016 | Vermaak | |
| 2017/0046704 A1 | 2/2017 | Büchner | |
| 2017/0213416 A1 | 7/2017 | Wortmann | |
| 2018/0122184 A1 | 5/2018 | Wortmann | |
| 2018/0122189 A1 | 5/2018 | Wortmann | |
| 2018/0349871 A1 | 12/2018 | Moshal | |
| 2018/0367621 A1 | 12/2018 | Mullender | |
| 2019/0004871 A1 | 1/2019 | Sukhomlinov | |
| 2019/0005473 A1 | 1/2019 | De Villiers | |
| 2019/0220834 A1 | 7/2019 | Moshal | |
| 2020/0057618 A1 | 2/2020 | Alex | |
| 2020/0204492 A1 | 6/2020 | Sarva | |
| 2020/0312085 A1 | 10/2020 | Rottcher | |
| 2020/0382420 A1 | 12/2020 | Suryanarayana | |
| 2021/0034997 A1 | 2/2021 | Harpur | |
| 2022/0005018 A1 | 1/2022 | White | |
| 2022/0143505 A1 | 5/2022 | Mathieson | |
| 2022/0197597 A1 | 6/2022 | Harpur | |
| 2022/0308911 A1* | 9/2022 | Barkett | G06F 9/546 |
| 2023/0035443 A1 | 2/2023 | Harpur | |
| 2023/0162559 A1 | 5/2023 | Harpur | |
| 2023/0315819 A1 | 10/2023 | Guy | |

OTHER PUBLICATIONS

Anonymous: "Amazon Gamelift Developer Guide", Dec. 16, 2022 (Dec. 16, 2022), XP093257041, Retrieved from the Internet: URL:https://web.archive.org/web/20221216055550if_/https://docs.aws.amazon.com/pdfs/gamelift/latest/developerguide/gamelift-dg.pdf#integration-testing-local.

Anonymous: "AWS Lambda Developer Guide—first 400 pages", Oct. 17, 2023 (Oct. 17, 2023), XP093257048, Retrieved from the Internet: URL:https://web.archive.org/web/20231017155908if_/https://docs.aws.amazon.com/pdfs/lambda/latest/dg/lambda-dg.pdf.

Anonymous: "Choosing between AWS Lambda data storage options in web apps", Oct. 28, 2020 (Oct. 28, 2020), XP093257397, Retrieved from the Internet: URL:https://aws.amazon.com/blogs/compute/choosing-between-aws-lambda-data-storage-options-in-web-apps/.

Anonymous: "How to build online multiplayer games using Amazon GameLift, AWS Serverless, and C++ | AWS for Games Blog", Sep. 15, 2021 (Sep. 15, 2021), XP093257033, Retrieved from the Internet: URL:https://aws.amazon.com/blogs/gametech/online-multiplayer-amazon-gamelift-aws-serverless/.

Extended European Search Report, European Patent Application No. 24212300.8, mailed Apr. 1, 2025.

Junichi Tatemura, Wang-Pin Hsiung, Web service decomposition: Edge computing architecture for cache-friendly e-commerce applications, Electronic Commerce Research and Applications, vol. 5, Issue 1, 2006, pp. 57-65, ISSN 1567-4223, https://doi.org/10.1016/j.elerap.2005.08.001.

* cited by examiner

SCHEDULER FOR TRANSACTION PROCESSING SYSTEM, AND SYSTEM INCORPORATING SUCH SCHEDULER

BACKGROUND

A transaction path (or "path") is a series of steps that are followed by a computing system in order to conduct a transaction. In an example embodiment, the transaction may include one or more discrete steps involving processing, communication with remote services, and/or storage of intermediate and final results. Existing systems that perform transactions are monolithic, rigidly architected, and overly complicated. As the technology has evolved, these existing systems were partially adapted for new types of transactions while retaining their monolithic nature. This evolution has accelerated in recent times, causing monolithic transaction paths to become brittle and error prone, with single points of failure. Making changes to these systems is time consuming, with extensive regression testing needed to ensure that the addition of new functionality does not inhibit the use or performance of pre-existing functionality.

SUMMARY

The embodiments herein provide technical improvements to these and potentially other technical problems by decomposing monolithic transaction processing systems into a number of discrete functional components. Each of these components is arranged to be able to perform a specific set of one or more functions. As a consequence, the decomposed server architecture is more flexible and reliable than its monolithic predecessors. Further, the decomposed server architecture can more readily be adapted to use parallelism, roll-back and roll-forward features, various pre-processing and post-processing steps, load balancing, and application loading time improvements. Other advantages are also possible.

Accordingly, a first example embodiment may involve one or more processors and memory storing instructions that are executable by the one or more processors to perform operations of software components comprising: a web site configured to allow selection of a server application, wherein the server application is associated with a path, wherein the path includes a set of steps, and wherein each of the set of steps is respectively associated with program logic to perform a discrete set of functions; storage containing metadata that relate to the server application and an operator of the web site; an application launcher configured to: receive a request on behalf of a client device, determine the server application based on the request and the metadata, and provide a client application to the client device, wherein the client application is configured to interact with the server application; and an orchestrator configured to execute the path, wherein at least some of the set of steps include interaction with one or more external services remotely accessible to the system, and wherein a context of the execution is written in a database between execution of at least some of the set of steps.

A second example embodiment may involve: receiving, by a web site, selection of a server application, wherein the server application is associated with a path, wherein the path includes a set of steps, and wherein each of the set of steps is respectively associated with program logic to perform a discrete set of functions; receiving, by an application launcher, a request on behalf of a client device; determining, by the application launcher, the server application based on the request, and also based on metadata that relate to the server application and an operator of the web site; providing, by the application launcher, a client application to the client device, wherein the client application is configured to interact with the server application; and executing, by an orchestrator, the path, wherein at least some of the set of steps include interaction with one or more external services, and wherein a context of the execution is written in a database between execution of at least some of the set of steps.

A third example embodiment may involve a non-transitory computer-readable medium, having stored thereon program instructions that, upon execution by a computing system, cause the computing system to perform operations in accordance with the first and/or second example embodiment.

In a fourth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Computing Devices and Cloud-Based Computing Environments

Figure 1:
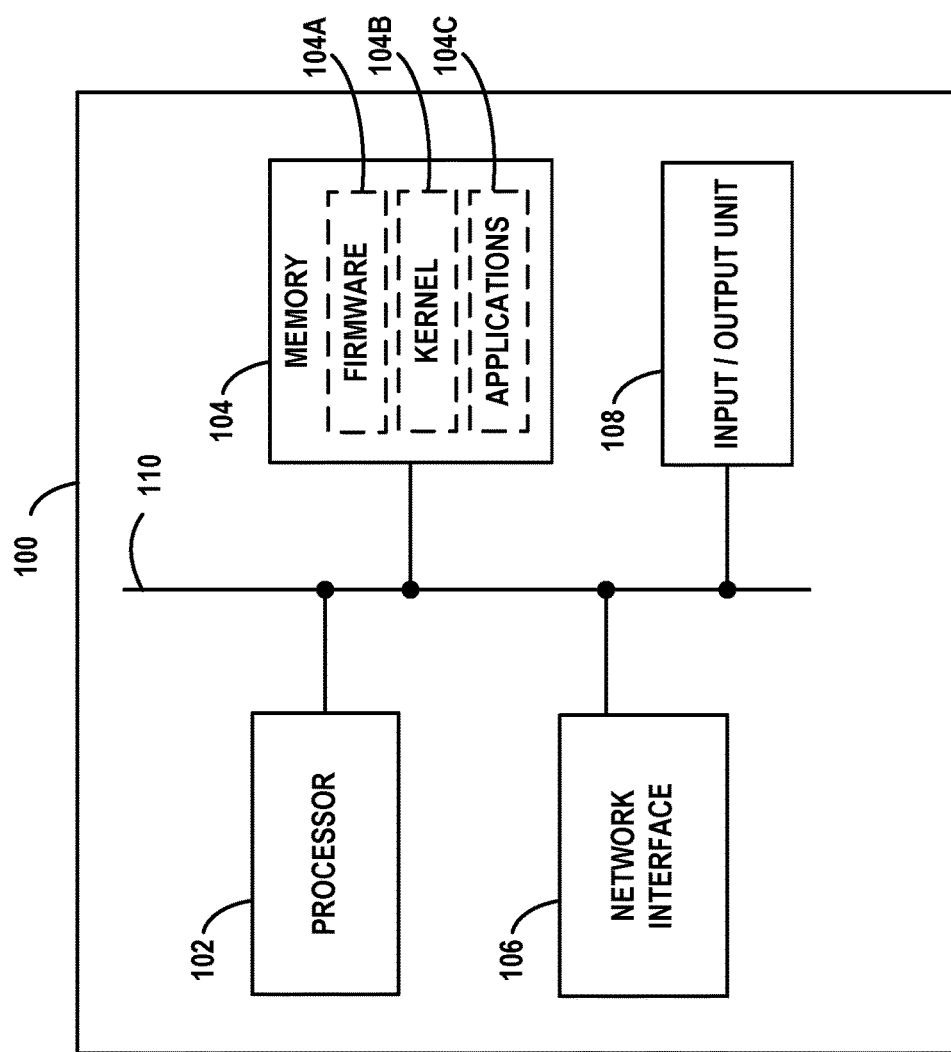
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet local-area media, such as coaxial cables or power lines, or over wide-area media, such as fiber-optic connections (e.g., OC-x interfaces) or digital subscriber line (DSL) technologies. Network interface 106 may additionally take the form of one or more wireless interfaces, such as IEEE 802.11 (Wifi), Bluetooth, global positioning system (GPS), or a wide-area wireless interface (e.g., using 4G or 5G cellular networks). However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, Bluetooth, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed as a cluster of server devices. The exact physical location, connectivity, and configuration of these computing devices may be unknown and/or unimportant to client devices. Accordingly, the computing devices may be referred to as "cloud-based" devices that may be housed at various remote data center locations.

Figure 2:
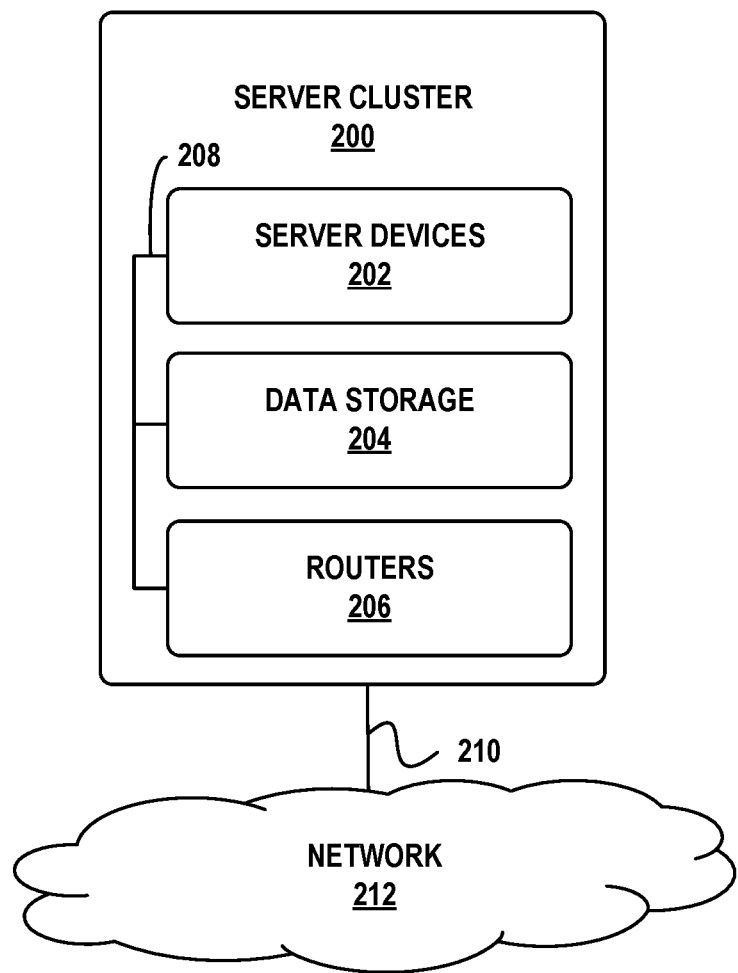
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the HyperText Markup Language (HTML), the extensible Markup Language (XML), Cascading Style Sheets (CSS), and/or JavaScript Object Notation (JSON), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages. Alternatively or additionally, Java may be used to facilitate generation of web pages and/or to provide web application functionality.

II. Example Transaction System

Figure 3:
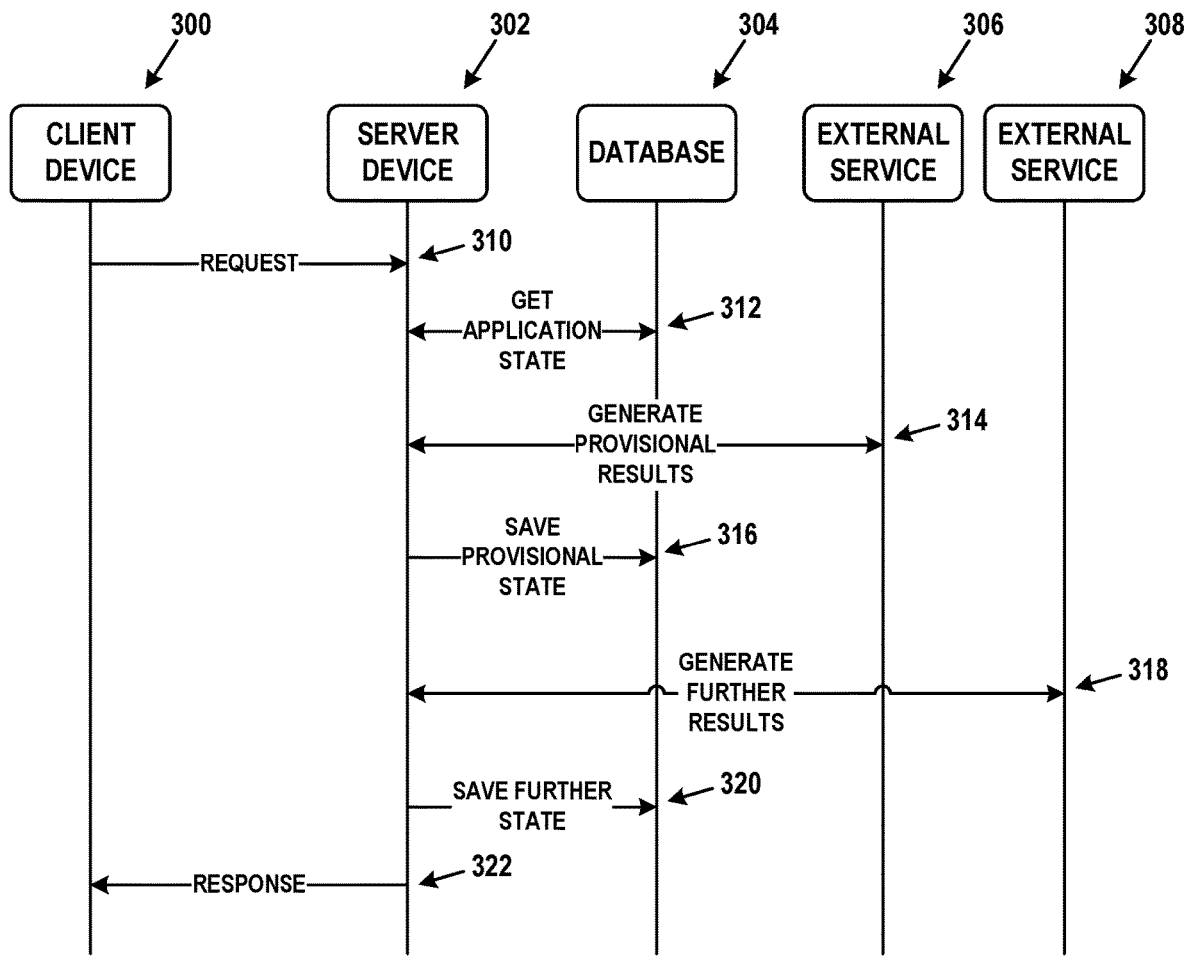
FIG. 3 is a message flow diagram, in accordance with example embodiments.

FIG. 3 depicts an example monolithic transaction processing system that can be used to facilitate various types of interactions with client devices (e.g., enabling web, email, storage, streaming, and/or other services). Such a monolithic system has a number of drawbacks relating to complexity, defect rates, testing, adaptability, and so on. Nonetheless, it can be instructive to consider how such a monolithic system operates so that the improvements provided by the embodiments herein can be fully appreciated.

FIG. 3 includes client device 300, server device 302, database 304, external service 306, and external service 308. These components may be communicatively coupled with one another such that client device 300 can communicate with server device 302, and server device 302 can communicate with each of database 304, external service 306, and external service 308. But other arrangements are possible.

Client device 300 may be a computing device as described in the context of FIG. 1. Thus, client device 300 may be a desktop computer, laptop computer, mobile phone, tablet, etc. To interact with server device 302, client device 300 may execute one or more dedicated client applications. Alternatively, client device 300 may do so by way of a web browser application or another form of web-based interface. In some environments, there may be many instances of various types of client devices (e.g., tens, hundreds, or thousands of client devices).

Server device 302 may be a computing device or computing cluster as described in the context of FIGS. 1 and/or 2. Thus, server device 302 may include one or more physical server devices in various arrangements. To interact with other devices, server device 302 may execute one or more server applications. These server applications may be multithreaded, capable of executing multiple instances simultaneously, and/or distributed across different units of physical hardware.

For sake of convenience, even where multiple server applications exist, they will be collectively referred to as "the server application" herein. In general, references to server device 302 and the server application may be used interchangeably unless context indicates otherwise.

Database 304 may provide an organized collection of data that is accessible to server device 302. Database 304 may operate on a physical computing device that is distinct from that of server device 302 or it may be incorporated into server device 302 in some fashion. Thus, database 304 may be purely software or a combination of hardware and software. Regardless, database 304 may support a number of operations, such as storing, providing, indexing, searching, querying, and updating data. In various embodiments, database 304 may operate as a relational database (e.g., using SQL), a NoSQL database (e.g., MongoDB), an in-memory database (e.g., Redis), or a graph database (e.g., Neo4j). In a relational database, for example, this data may be stored in one or more tables in accordance with a predefined schema. Other possibilities exist. In some embodiments, database 304 may represent multiple physical or logical databases. Each of these may be replications of one another for purposes of redundancy and/or load balancing, or each may have a different intended use.

External services 306 and 308 may be remote services accessed by way of respectively-defined application programming interfaces (APIs). These APIs may be based on representational state transfer (REST) interfaces, or take some other form such as remote procedure call (RPC), simple object access protocol (SOAP), or Websockets. Thus, external services 306 and 308 may be authentication services (used to authenticate users of client device 300 that access server device 302), geolocation services (used to identify the physical location of client device 300 and/or a user of client device 300), machine learning services (used to apply trained machine learning models to classify the provided input), generative artificial intelligence (AI) services (to generate text, images, audio, and/or video based on a prompt), and/or additional database services (used to provide and/or store data related to client device 300 and/or server device 302). Alternatively or additionally, external services 306 and 308 may provide various types of application-specific services, such as web, email, social media, or streaming, services.

In some environments, one or more of external services 306 and 308 may be provided by third parties that are distinct entities from those that own or operate client device 300, server device 302, or database 304. In these environments, the third parties may be referred to as "operators." In other environments, one or more of external services 306 and 308 may be integrated with server device 302 and/or database 304. Thus, use of the term "external" does not require that external services 306 and 308 are provided by a third party, and instead may be provided by the entity that operates server device 302. For example, external services 306 and 308 may be "inline" services performed by server device 302 and/or database 304.

In general, FIG. 3 depicts messages flowing between elements of a transaction processing system. Such a system may refer to just server device 302 and its operations, or server device 302, database 304, any of the external services, and their combined operations. In this figure, communicated information generally flows in the direction of the arrows. However, even steps represented by unidirectional arrows may involve at least some information flowing in the opposite direction (e.g., acknowledgements to messages transmitted in the direction of an arrow).

As shown in FIG. 3, a transaction may include a number of steps known as a transaction path (or simply, a "path"), and these steps may be carried out by server device 302 in a particular order. Different transaction paths may carry out different combinations of steps in different orderings, and all of these transaction paths may be monolithically implemented in the server application. Here, such a monolithic implementation means that the transaction paths are explicitly coded within a single large application or a small number of large applications (e.g., all components of these applications are interwoven and tightly coupled, often into a single program on a single platform).

As one way of initiating a transaction, client device 300 may engage in step 310 with server device 302. Step 310 may be transmission of a request, query, command, API call, or other form of invocation that can cause server device 302 to at least attempt to carry out a specific step of the transaction path. The type of step may be implied or made explicit in step 310. In response to step 310, server device may carry out steps 312, 314, 316, 318, and 320. In various embodiments, more or fewer steps may be carried out.

Step 312 may involve server device 302 communicatively interacting with database 304 to obtain application state relating to execution of the application. In some cases, this application state is specific to a client device, such as client device 300. The communication may include server device 302 querying database 304 to read and obtain this state without making any updates to database 304. Thus, step 312 may be a read-only operation. The state may contain sufficient information (e.g., application configuration data) so that server device 302 can perform the remaining steps of the transaction path. Alternatively, server device 302 may obtain further application state from database 304 at other points in the transaction path (not shown).

Step 314 may involve server device 302 communicatively interacting with external service 306 to generate provisional results to add to the application state. Doing so may include server device 302 providing at least some of the application state obtained in step 312 to external service 306 by way of a communication interface. Doing so may also include server device 302 receiving the provisional results from external service 306, again by way of a defined interface. In some cases, server device 302 may pre-process the application state before providing it to external service 306, post-process the provisional results before adding them to the application state, and/or generate part of the application state.

In some environments, external service 306 may be an authentication service that determines whether client device 300 is permitted to log into or obtain further information from server device 302. In these environments, the application state may include credentials for a user of client device 300, such as a userid and password. In other environments, external service 306 may provide results of execution of an application such as a machine learning classifier, a generative AI program, or some other type of application.

Step 316 may involve server device 302 writing the results from step 314 and any subsequent post-processing to database 304 as part of the application state. As shown in FIG. 3, what is written may be referred to as the provisional state, in that it represents the outcome of an intermediate step. Step 316 may take place immediately or shortly after step 314 concludes and may occur in response to step 314.

Step 318 may involve server device 302 communicatively interacting with external service 308 to generate further results to add to the application state. Doing so may include server device 302 providing at least some of the application state obtained in steps 312 and/or 314 to external service 308 by way of a defined interface. Doing so may also include server device 302 receiving the further results from external service 308, again by way of a defined interface. In some cases, server device 302 may pre-process the application state as it stands after step 314 before providing it to external service 308, post-process the further results before adding them to the application state, and/or generate part of the application state. This pre-processing and post-processing may involve transforming the results and/or application state into a consistent format or making other modifications for purposes of facilitating storage and processing.

In some environments, external service 308 may be one of various types of application services. The invocation of this application service may be a consequence of application state obtained in steps 312 and/or 314. For example, external service 308 may be a web-based service (arranged to provide online web-based information to server device 302), an email service (arranged to provide interaction with email accounts to a user of client device 300), a social media platform (arranged to provide social media posts, updates, messages, comments, and/or news feeds to a user of client device 300), a storage system (arranged to store data and provide copies of stored data on behalf of client device 300 or server device 302), or a streaming service (arranged to transmit a stream of audio and/or video to server device 302 and/or client device 300).

Step 320 may involve server device 302 writing the further results from step 318 and any subsequent post-processing to database 304 as part of the application state. As shown in FIG. 3, what is written may be referred to as the further state, in that it represents the outcome of further step of the transaction path. In some cases, the further state may be a final state in that it represents the final outcome of the carrying out the transaction path. Step 320 may take place immediately or shortly after step 318 concludes and may occur in response to step 318.

Step 322 may involve server device 302 transmitting a response to client device 300 containing a representation of the outcome of the transaction. This outcome may be as simple as a Boolean indicator of success or failure (e.g., true or false, respectively) or instructions or program code that cause a user interface on client device 300 to display the outcome in some manner. This may involve client device 300 displaying some form of structured information (e.g., dashboards, tables, or charts), images, and/or animations.

The transaction processing system depicted in FIG. 3 can be implemented in a stateless fashion. Thus, the steps performed by server device 302 are not dependent on any in-memory (e.g., in RAM) state during their execution. This stateless design means that if the hardware of server device 302 was to turn off and/or all in-memory state was lost at any point in time, server device 302 could restart and gracefully resume from where it left off. The actual state of the transaction is always stored in database 304.

Notably, step 312 does not change the state as stored in database 304. Step 316 saves the provisional state to database 304 with the understanding that this provisional state has not yet been used in step 318. Step 320 saves the further (perhaps final) state to database 304 with the understanding that this further state has not yet been used in step 322. In the case that step 318 can either succeed or fail, the final state may be written to database 304 when step 318 is successful, but the in-memory representation of this state may be marked as void or invalid when step 318 fails.

Given this software architecture of server device 302, execution of the transaction path may occur multiple times in parallel client sessions for different client devices or different client applications on client devices. It will only use local variables dedicated to those client sessions, so there is no need for explicit mutual exclusion mechanisms (e.g., mutexes, spinlocks, or semaphores) for avoidance of race conditions.

This design allows many requests to be processed in parallel. Since the transactions are stateless, a number of server application instances can execute simultaneously that is only limited by the processing, storage, and communications limits of the transaction processing system. Typically, database 304 is the convergence point where multiple transactions can be in various stages the same time. It is possible to split users and/or client devices across multiple instances of database 304 to distribute transactions and improve performance.

Nonetheless, the transaction processing system design of FIG. 3 does have some drawbacks. Particularly, it does not easily or efficiently support new features or functionalities. A consequence is that development, maintenance, and support of this software design can grow complex and cumbersome.

As one example, step 312 can be thought of as what organizes the relevant information that can be used in step 314 that follows. Primarily, step 312 involves retrieving, from database 304, the most up to date version of the application state so that this application state can be used to generate the provisional result. The step of organizing the relevant information has grown in scope based on evolving security requirements, application capabilities, and user differentiations. Thus, there have been more and more checks put into place regarding how a user is permitted to interact with the server application.

For instance, user capabilities may be geo-fenced so that users in different geographic locations (e.g., states, provinces, regions, or countries) have different degrees of access to server application features. Furthermore, the server application may have controls over how many transactions, the types of transaction, and/or the magnitude of each transaction in which a user may participate (here, transaction magnitude may involve an amount of data exchanged between client device 300 and server device 302, the amount of processing server device 302 requires to carry out the transaction, the amount of time that the user engages with the server application, and/or a pecuniary value of the transaction). Moreover, certain users might have priority over others in some fashion so that their transactions are processed more expeditiously. Given these requirements, the server application may also check the integrity of some or all incoming data packets in the request of step 310 to ensure that the data packets have not been illicitly modified (i.e., hacked).

In any event, transactions that otherwise would have been triggered by step 312 may be blocked by server device 302 if they do not meet any of these requirements. This means that server device 302 and/or database 304 should understand and support the relevant requirements, check these requirements, and then act accordingly. This increases the complexity of server device 302 and/or database 304. Notably, any change to one of these features or the addition of a new feature requires updates to the server application as well as database 304.

As another example, step 314 is designed to treat external service 306 as a stateless "black box." As such, external service 306 receives all of its input in a request or query transmitted by server device 302 and provides intermediate results based on this input as well as its programming. Notably, the server application and external service 306 may be developed independently by different entities, so communication therebetween by way of a strictly-defined interface may be required. The server application cannot change the input and expect external service 306 to be configured to understand this new input arrangement. Likewise, external service 306 should provide to the server application the intermediate result in a form that the server application is configured to understand. The same constraints apply to interactions between server device 302 and external service 308.

By nature of database 304 being the sole source of truth for all transaction data, external service 306 might not have access to any other source of input and might not save any state associated with the server application. What this amounts to is that when a new feature or functionality is developed, both the server application and external service may need to be modified to support that feature or functionality. Again, the same or similar limitations may apply to interactions between server device 302 and external service 308.

III. Improved Transaction Processing System

To modify the transaction processing system of FIG. 3 so that it is more flexible and extendible, the programming logic of server device 302 and database 304 can be changed. In some situations, it is desirable to only modify server device 302 and database 304 to support new steps and transactions. While it is possible to modify the external services, doing so may require that these services are also modified to support synchronization, rollbacks, reporting, coordination, and orchestration in order to align their operations with those of server device 302 and database 304. Therefore, it is simpler to limit the modifications to server device 302 and database 304 where possible. For example, modifications may be made to server device 302 and database 304 as well as the interfaces between server device 302 and the external services in order to reduce the impact on the external services.

Furthermore, some of the new steps and transactions may involve integrating new technologies into transaction paths. For example, these can be based on so-called web3 technology that supports blockchain to distribute immutable database records amongst multiple parties. Using blockchain, these parties can obtain consensus regarding transactions or other behaviors of users or entities. Blockchain mechanisms can include smart contracts and cryptographic tokens that represent various capabilities with respect to the server application and/or external services. For sake of example, U.S. Patent Application Publication No. 2023/0315819 and PCT Patent Application Publication No. WO2023193971, both hereby incorporated by reference herein, describe how non-fungible tokens (NFTs) can be used to control access to various features of software applications. Integrating these new technologies into current systems is simply not practical, as a re-engineering of the server application and database 304 is required for each.

Moreover, at least some of the external services may take the form of microservices. Microservices can be part of decomposed architectures in which an application includes or relies upon a set of relatively small and discrete networked or integrated services. Thus, the microservices architecture stand in contrast to a monolithic application in that each of the microservices may be independently maintainable, testable, and deployable and/or otherwise loosely coupled to one another and the overall application.

For example, a web site that allows authenticated users to have access to a particular application may be designed as a server application that makes use of microservices for: (i) processing HyperText Transfer Protocol (HTTP) requests and providing appropriate static and/or dynamic web-based content (e.g., HTML, CSS, JavaScript) in corresponding HTTP responses, (ii) allowing new users to register for the service and authenticating existing users as they log on, (iii) session management for logged in users, and (iv) one or more database interfaces to access stored web content. Other possibilities exist. Notably, many different web sites can be based on this or a similar arrangement of microservices.

As another example, an external service may provide streaming of video content to registered users may be designed as a server application that makes use of microservices for: (i) processing user requests for video content and providing the requested video content in response to these requests, (ii) allowing new users to register for the service and authenticating existing users as they log on, (iii) session management for logged in users, (iv) one or more database interfaces to access stored video content, (v) a search, browse, and/or recommendation service for users to find video content based on metadata like titles, descriptions, genres, and actors, (vi) a monitoring and analytics service that collects data on user engagement, streaming quality, and service performance, and (vii) a content delivery network gateway that provides mechanisms for distributing video content across geographical locations to reduce latency experienced by users. Other possibilities exist. Notably, many different streaming services can be based on this or a similar arrangement of microservices.

Additionally, some microservices may be common and/or generalizable between these video streaming services and the aforementioned web site services (e.g., registration, authentication, session management, etc.). Thus, common units of software that perform and/or interact with these microservices may be used across different transaction paths within multiple applications of the same or a different type.

Calls to these microservices (e.g., the server application invoking one or more of the microservices) may be arranged in various ways and orderings. In some cases, certain sets of calls may be performed in parallel. In other cases, a particular sequence of calls might be performed serially. For a given transaction path, some combination of parallel and serialized calls may be possible.

The employment of microservices in the manner described herein allows a server architecture to be able to perform one more or more distinct sets of server application functions (e.g., web-based services, streaming services, email services, machine-learning and AI services) in a modular and efficient manner. Doing so avoids two disadvantageous server application designs of previous transaction processing systems. The first is to place all desired functionality into a single server application, resulting in a complex, unwieldy, and fragile application that is difficult to test, debug, maintain, and expand. The second is to have different server applications for each transaction path, resulting in the need to design, maintain, and test the overlapping functionality of each server application independently.

Regarding terminology, a transaction path is an arrangement of steps performed by one or more server devices of the transaction processing system, perhaps with assistance from external services. A server application may support the execution of one or more transaction paths. A transaction is a discrete execution of the steps of a transaction path, such that the transaction has a beginning and an end as defined by the transaction path. Thus, a server application might support multiple transaction paths, each of which may be used to carry out many transactions. Nonetheless, these terms are intended to be used in a flexible and non-limiting fashion.

A. Decomposed Server Architecture

Figure 4:
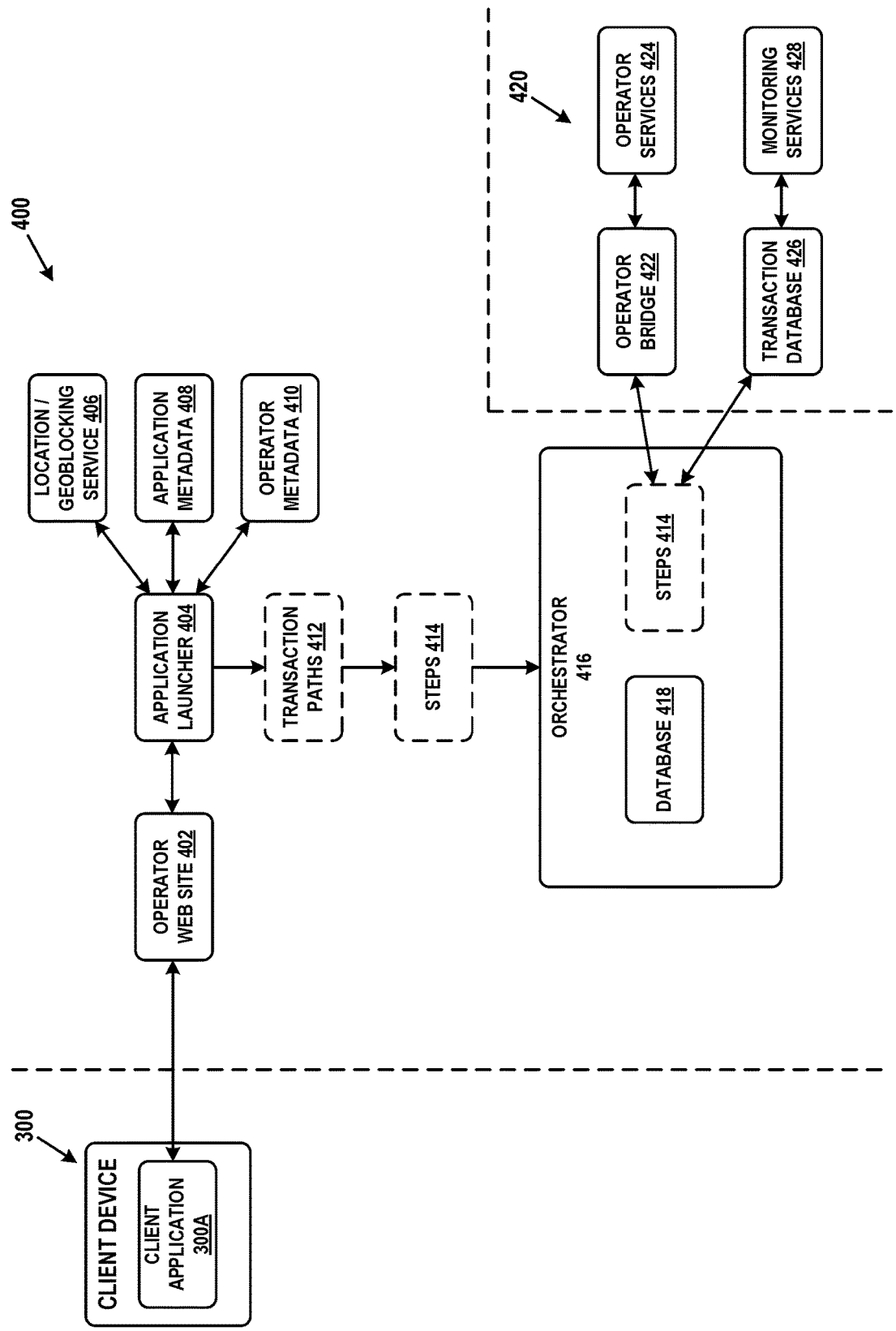
FIG. 4 depicts a decomposed server architecture, in accordance with example embodiments.

FIG. 4 depicts a decomposed server architecture 400 that provides numerous advantages over previous transaction processing systems. These advantages include but are not limited to reuses of modular software components, less need for testing, and a more robust and extensible design. Consequently, use of server architecture 400 results in higher performance, greater stability, and more flexibility than the previous approaches.

In FIG. 4, objects with solid lines generally refer to software modules and objects with dashed lines generally refer to data. However, some software modules (e.g., steps 414) may be treated as data.

Server architecture 400 includes software modules for operator web site 402, application launcher 404, location/geoblocking service 406, application metadata 408, operator metadata 410, and orchestrator 416. Based on this architecture, a user of client application 300A on client device 300 can request use of a particular "web site" or "application", and application launcher 404 can determine the appropriate one or more of transaction paths 412. Each of transaction paths 412 is defined at least in part by one or more of steps 414. Orchestrator 416 may contain or have access to database 418 that may maintain initial, intermediate, and/or final state for steps 414 as orchestrator 416 carries out these steps. Further, some of steps 414 may interact with operator bridge 422 to access operator services 424 and/or interact with transaction database 426 to provide information for monitoring services 428.

Notably, server architecture 400 may contain more or fewer software modules arranged in various ways. Thus, server architecture 400 is just one example of how monolithic server applications can be decomposed and made more flexible. Each of these software modules is briefly described below.

For sake of convenience, even where multiple server applications exist, they will be collectively referred to as "the server application" herein. In general, references to server architecture 400 and the server application may be used interchangeably unless context indicates otherwise.

Operator web site 402 may be a web-based interface and/or portal through which a user can register, login, edit their account settings and preferences, and so on. There may be many different instances of operator web site 402 (e.g., for different operators and accessible by different URLs) supported by server architecture 400. Here, operators may refer to entities that provide, control, and/or manage the applications available to client devices. Some operators may require that similar application behave in different ways from other operators.

Application launcher 404 may process the launching of a specific application defined by one or more transaction paths. The application may be implicitly associated with the selected operator web site 402 or the user may select the specific application by way of operator web site 402. Application launcher 404 may provide client application 300A (e.g., by way of operator web site 402) to client device 300. Client application 300A may be specific to the application that was selected and may executed in a web browser of client device 300 (e.g., as an HTML5 application) or may be a standalone application (or "app"). Thus, application launcher 404 may store or have access to one or more instances of executable code or executable software image files per application for execution on a client device (here, an executable software image file contains program code capable of being executed on a computer).

In order to launch an application, application launcher 404 may access one or more of location/geoblocking service 406, application metadata 408, and/or operator metadata 410 to determine the version of the application to launch, its operational environment and parameters, and which it can be launched by client device 300. A successful launch will result in one or more transaction paths 412 being provided to orchestrator 416. A given transaction path may include one or more of steps 414, where each of these steps is a discrete set of functionality.

Location/geoblocking service 406 may be a service that maps client devices, their IP addresses, users, and/or the reported locations of any of these entities to a geographic region. In cases where an application or transaction path is limited to certain regions or is configured to be blocked in other regions, location/geoblocking service 406 may transmit sufficient information to an edge device, router or firewall so that the client device in question can or cannot use the application. For example, certain applications may only be available in particular locations due to language, cultural, regulatory, or other concerns.

Application metadata 408 may store metadata about each application (e.g., the application's name, operator, allowed or blocked regions, etc.). On an attempted application launch, application metadata 408 can be checked to determine whether the client device is permitted to access the application.

Operator metadata 410 may store metadata about an operator, such as an operator name, setting, and general environment (e.g., graphical themes). On an attempted application launch, operator metadata 410 can be checked and/or accessed to control the operational parameters of the application.

As noted above, orchestrator 416 may receive representation of one or more transaction paths 412. For sake of simplicity in the discussion below, it is assumed herein that just one transaction path 412 is provided. This transaction path 412 may include one or more steps 414. The transaction path 414 may also define one or more orderings of steps 414 as well as indications of which of these steps may be performed in parallel and which must be performed serially. For example, the transaction path 414 may indicate which steps should follow other steps of steps 414. In general, steps 414 may be carried out one or more times by orchestrator 416 per transaction. Thus, a transaction path 412 may also include some indication of a loop or repetition amongst steps.

Given all of this, a transaction path 412 may represent steps 414 in the form of a directed graph. Each of steps 414 may be a node in such a graph and an edge directed (e.g., with an arrow) from a first node to a second node may indicate that the step represented by second node is to be executed after the step represented by the first node. But other possibilities exist.

External services 420 may be a set of services that are hosted remotely or outside of server architecture 400 or the transaction processing system. External services 420 may be invoked or accessed (e.g., by a defined API) by one or more of steps 414.

For example, one or more of steps 414 may access operator bridge 422, which services as a gateway, proxy, or interface to operator services 424. Operator services 424 may include functionality that manages the relationship of client device 300 and/or its user with a particular operator. Where there are multiple operators, there may be multiple instances of operator bridge 422 and operator services 424 (e.g., one of each for every operator).

In another example, one or more of steps 414 may access transaction database 426. For instance, one or more of steps 414 may transmit log data regarding their execution and/or its results to transaction database 426. Transaction database 426 could be an SQL or NoSQL database, or take some other form. Monitoring services 428 may read this log data to determine performance, correctness, and other aspects of the server application. In some cases, monitoring services 428 may be managed and/or operated by a third party that is responsible for overseeing the performance of the server application.

Thus, in some cases, each of steps 414 may access an external service. Alternatively, at least some of steps 414 may be in-line (i.e., executed by the server application without invoking an external service).

B. Step Properties

Figure 5:
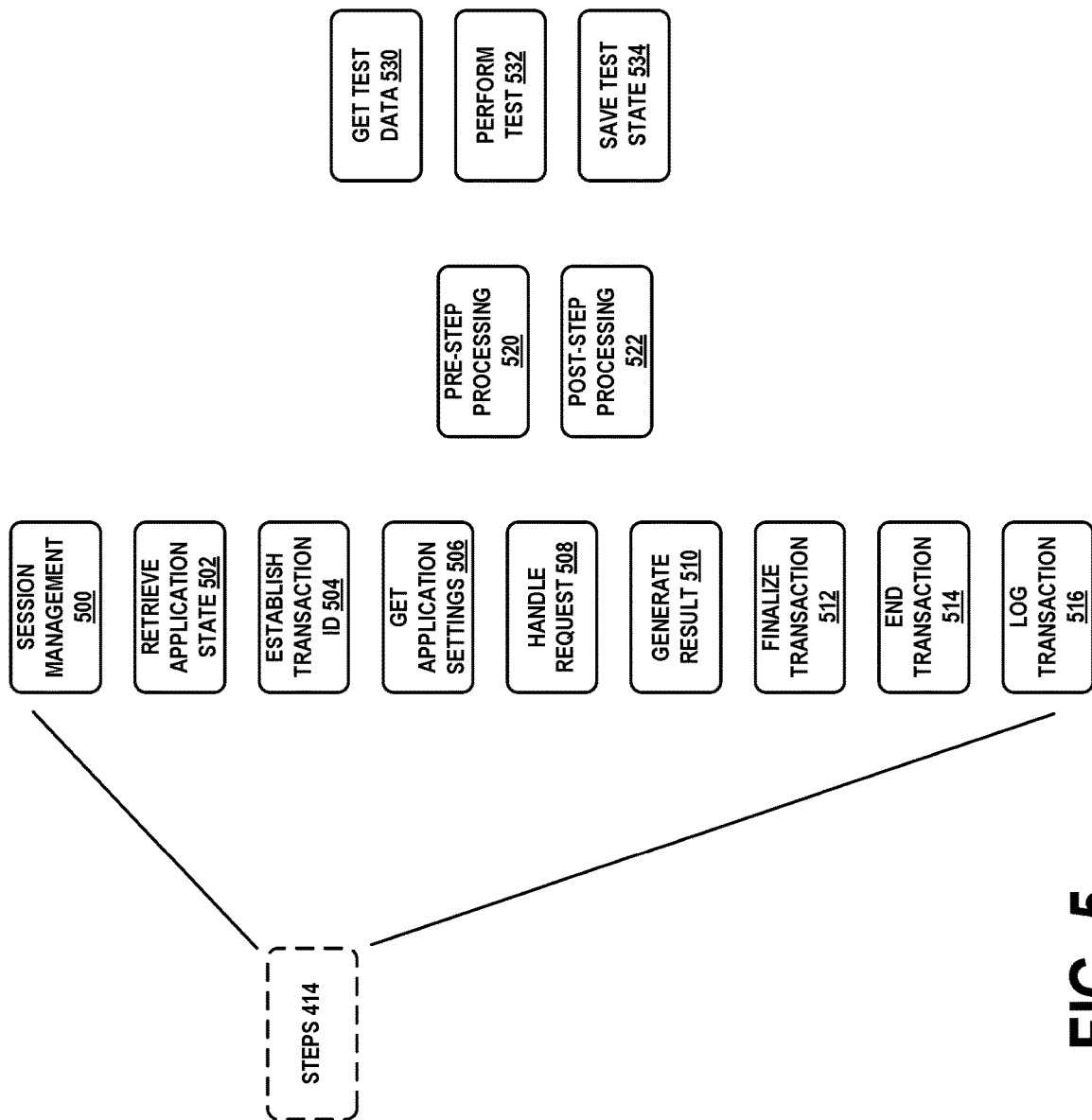
FIG. 5 depicts modules representing steps that can be carried out by the decomposed server architecture, in accordance with example embodiments.

FIG. 5 provides more examples of steps 414. Particularly, steps 414 may be any one of steps 500-534 shown in FIG. 5, though other types of steps are possible. As noted, different arrangements and/or subsets of steps 414 may be represented by transaction paths 412.

Session management 500 may involve retrieving and maintaining session information for the transaction. This could include parts of application metadata 408, operator metadata 410, and/or user-specific information.

Retrieve application state 502 may involve obtaining (e.g., from database 418 or elsewhere) the application state and/or the user's progress within the server application as represented by steps of the transaction path.

Establish transaction ID 504 may involve generating a transaction identifier (e.g., a unique number or token) representing the current transaction.

Get application settings 506 may involve obtaining operational settings for the server application (e.g., from application metadata 408, operator metadata 410, and/or user-specific information).

Handle request 508 may involve receiving and processing a request from client application 300A, as well as possibly providing a representation of the request to the operator by way of operator bridge 422 and operator service 424.

Generate result 510 may involve determining a result (e.g., in response to a request received in handle request 508) and possibly providing the result to client application 300A. This result may be determined locally by the server application or in conjunction with the operator by way of operator bridge 422 and operator service 424.

Finalize transaction 512 may involve storing the result of the transaction to database 418, as well as possibly providing a representation of the result to the operator by way of operator bridge 422 and operator service 424.

End transaction 514 may involve completing and ending the transaction. For example, this may involve deallocating memory used for the transaction and otherwise marking the transaction as complete, as well as possibly notifying the operator that the transaction is complete by way of operator bridge 422 and operator service 424.

Log transaction 516 may involve publishing data related to the transaction to transaction database 426. This data may include, for example, timestamps of times at which various steps of the transaction took place, the names or other representations of the steps, the user, server application, and/or operator involved, statistics about the transaction (e.g., length in time, amounts transacted, options selected by the user, features of the server application used, and so on). The published data may be stored in transaction database 426 possibly in a manner accessible to monitoring services 428.

In addition, each of steps 500-516 may be subject to pre-step processing 520 and/or post-step processing 522. In other words, some of steps 500-516 may be preceded by an instance of pre-step processing 520, some of steps 500-516 may be followed by an instance of post-step processing 522, and some of steps 500-516 may be preceded by an instance of pre-step processing 520 and an instance of post-step processing 522. This pre-step and post-step processing may be different for some of steps 500-516. Alternatively, such processing may be common for some of steps 500-516. As an example, one or more of steps 500-516 may be associated with a pre-processing step that saves application state prior to the step being carried out and/or a post-processing step that saves application state after the step is carried out.

Put another way, orchestrator 416 may function as a scheduler, facilitating the performance of steps 414 required for a specific transaction path 412. It initiates a sequence of steps 414 at the required times. To do so, orchestrator 416 may receive a request from client application 300A and responsively execute a defined transaction path 412 through steps 414 based on the request. Depending on the server application, there might be need for different combinations of steps 414 to be in the transaction path 412.

Get test data 530, perform test 532, and save test state 534 allow each of steps 414 and/or sequences thereof to be tested independently of the rest of the steps 414 in transaction path 412. Advantageously, this allows test data to be used to instrument the application state, perform one or more tests on this instrumented application state, and save the results of these tests. These built-in testing steps permit the construction of application states that are expected to be rare or at least improbable in real-world deployments.

The sequence of steps 414 allows for some of these steps to be performed in parallel, while other steps are performed sequentially. The transaction path 412 can be customized to the nature of the request, containing as many of steps 414 as required in various orderings. Each of steps 414 may execute some program logic, and at least part of this execution can be carried out via a call to an external service.

C. Saving of Context and Step Independence

When execution of a transaction path 412 is initiated, an entry is created in a database 418 for the execution. At any point during the processing of the transaction path 412, the state of the server application with respect to the transaction path 412 can be saved into this entry in database 418. As noted, the transaction path 412 allows for configuration of each of steps 414, including the ability to save the current application state before the step is executed and after the step has executed. The application state stored in database 418 is also referred to as "context." This context can be passed into each of steps 414 in the transaction path 412 and the respective step can use this information, as well as update, edit, and/or add to this information. Thus, the context may change as execution of the transaction path 412 progresses.

An example of data can be added to the context and used in a later step is as follows. Any of steps retrieve application state 502, establish transaction ID 504, and get application settings 506 may update the context. When the generate result 510 step is called, it may use what was stored in the context in order to determine the result. Thus, various instances of steps 414 may add to the context and use it as required. A tight coupling of the data used between these steps is not required. The data being used in the transaction processing is highly flexible, the context data structure is not bound to any schema of database 418 or steps being executed.

By saving the context while executing the transaction path 412, it facilitates a degree of fault tolerance. If execution of the transaction path is halted due to a powering off of a device, an application crash, a lack of network connectivity, or some other hardware or software fault, the exact state of the transaction path 412 has been saved. When the transaction path 412 restarts (e.g., after a reboot of hardware, relaunch of one or more applications, or a regaining of network connectivity), orchestrator 416 can read this state and determine how to proceed. For example, orchestrator 416 could continue to process the transaction path 412 from where it left off, or determine that it needs to undo something that has been done and update the context accordingly.

Figure 6:
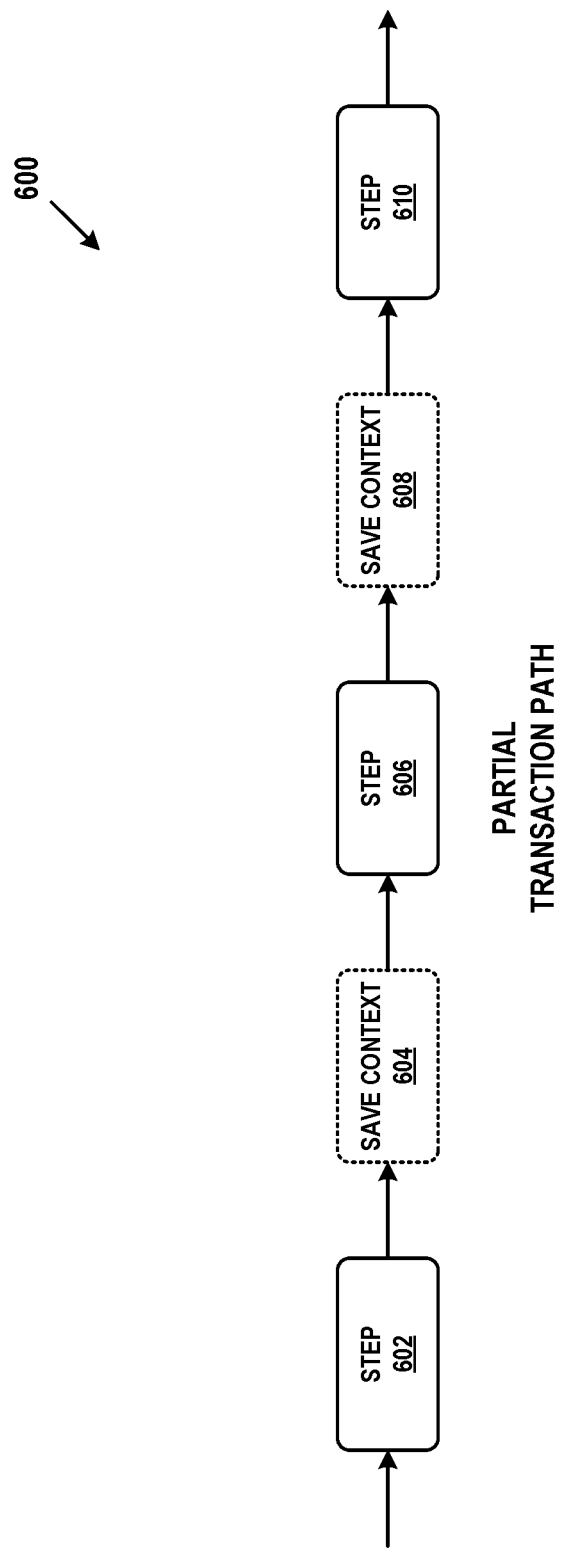
FIG. 6 depicts the saving of context between steps of a transaction path, in accordance with example embodiments.

FIG. 6 depicts the saving of context between steps. Notably, flow diagram 600 includes steps 602, 606, and 610, which may be selected from steps 414 and which may be part of a transaction path 412. Save context operation 604 optionally occurs between steps 602 and 606. Similarly, save context operation 608 optionally occurs between steps 606 and 610.

Each of steps 414 may be responsible for its execution independently from any other of steps 414. In this manner, steps 414 do not have interaction with the transaction path 412 or other of steps 414—instead, a step is passed the current context and executes with this context. It may happen that the connection to a particular step's service is lost and this service needs to be called again in order for the step to complete. Such a step is designed so that it may be called twice or more with the same context, but it will only perform the execution once.

In the case that a step is stateless (e.g., the step itself does not maintain any state of its own), then the execution can easily be called again. If the step stores any data or calls to any external service, it is designed to be responsible for being called again and for handling second and subsequent calls correctly. In other words, the step may exhibit idempotency, in that it guarantees that performing the step multiple times will yield the same result as if it was executed only once.

Once a step has executed successfully, it can add data to the context. This data can then be saved after the current step and before the next step is executed. This will be saved to database 418. Thus, the step can provide, by way of the context, data in a completed state to the next step in the transaction path. This next step may also use the context.

It should be noted that a step might not be able to communicate directly with another step. Instead, steps communicate with one another by storing data in and reading data from the context. This principle helps maintain the transaction processing software architecture as a composition of small, well-defined, and independent pieces of logic. Therefore, future changes can be made without impacting large pieces of code and other logic. Indeed, individual steps can by modified, upgraded, adapted or changed often without affecting the other steps in the transaction path. This independence contrasts with existing systems, where all logic is collectively hosted and changes are exceedingly complicated. The independence of steps also allows people to modify/work on steps at the same time, without needing to modify a single file. This adds flexibility when adding new applications types, as new types of microservices can be created, tested, and modified outside of the existing transaction path.

D. Step Parallelization and Serialization

As noted above, transaction path 412 and orchestrator 416 allow some of steps 414 to be executed in parallel while others may execute in series. This is possible if the steps executing in parallel do not need data from the context that was inserted or added during a previous step. In the steps of FIG. 5, retrieve application state 502 and get application settings 506 do not require any information from the context and can be executed in parallel to one another. Thus is just one example of parallelism and other may exist.

By executing these steps in parallel (e.g., calling the relevant functions in parallel), the efficiency and speed of executing the entire transaction path 412 is improved. This improvement is notable in comparison to the prior monolithic designs, where steps necessarily are executed one after the other. Nonetheless, when executing steps in parallel, the data that is added to the context by such steps should be stored in separate areas of the context to avoid collisions or race conditions.

When some of steps 414 are to be executed in series, this may be due to the output of one step being needed in order to execute the next in the specified order. As an example, some of transaction paths 412 may indicate that the following steps are to be executed in series: handle request 508, generate result 510, finalize transaction 512, end transaction 514, and log transaction 516.

E. State Roll-Back and Roll-Forward

In the event that something goes wrong during the execution of a transaction path 412, orchestrator 416 can control whether transaction path 412 will halt and roll the context backward (roll-back), or retry one or more of steps 414 (roll-forward). Since steps 414 are independent, they have no knowledge of and minimal or no impact on the execution of other of steps 414 or transaction path 412 as a whole. Thus, each of steps 414 need only rely on the orchestrator 416 for invocation if execution is to be repeated.

As an example, consider steps 500-516 of FIG. 5. These steps may be executed in the order shown (e.g., session management 500, then retrieve application state 502, and so on, ending with log transaction 516). These steps may be logically divided at a boundary between generate result 510 and finalize transaction 512. If generate result 510 is successful, the boundary is crossed and any failure of the transaction processing system beyond this point for any subsequent step(s) may cause those step(s) to be retried, possibly more than once. If a failure of the transaction processing system occurs before the boundary, the processing of all previous steps may be rolled back and the transaction path 414 may be restarted. Each of transaction paths 412 may have such a boundary, possible in different locations in accordance with the ordering of steps 414 and application-level requirements.

The logic behind this approach is that if generate result 510 provides a valid result, the transaction should be completed by rolling it forward. If such a result is not obtained, the user did not receive a result and the roll-back can be used to generate a new result.

If a roll-forward cannot be executed and completed after some time, a manual completion of the transaction path 412 may be employed, or the transaction should be voided. The transaction processing system design is such that it is clear which transactions are within a transaction path 412 and thus not complete. Notably, these incomplete transactions can be determined by querying database 418 for the context of transactions and determining which have not yet completed.

F. Transaction Path Extensions

It is possible to add new steps to steps 414 and to create new instances of transaction paths 412 with new combinations of steps 414. Particularly, transaction paths 412 are designed so that the steps 414 in each can be configurable. This provides flexibility to have different transaction paths 412 for different use cases. Some transaction paths 412 may require more of steps 414 than others, and can be configured to meet the needs of a specific server application, operator, geographic location of user, and so on.

Examples of extensions to server applications include new steps to: obtain, calculate, or otherwise determine custom application settings; request and receive application state from different external services; perform new test functions; and/or replaying parts or all of a transaction without the replay impacting the context of a transaction path 412.

Examples of extensions for a specific operator include new steps 414 to: provide in-transaction communication relating to the specific operator, obtain user-personalized state from external services relating to the specific operator; and/or distribute the functionality of one or more of steps 414 to external services relating to the specific operator.

Examples of extensions relating to the geographic location of the user include new steps to: check a configuration or setting specific to a particular geographic location; steps dedicated to communicating to a geographically-specific external service; and/or steps 414 that limit transactions in a manner specific to a particular geographic location.

A new server application can be developed and can either use a previously defined transaction path 412 or a new transaction path 412 may be created. In some cases, existing steps 414 may be reused for this new transaction path 412 or new steps 414 may be created for use with it.

G. Pre-Processing and Post-Processing

As noted above, pre-step processing 520 and/or post-step processing 522 may be used to modify the behavior of a transaction path. Pre-step processing 520 can be used to modify and/or use the context of a transaction before one of steps 414 is performed, and post-step processing 522 can be used to modify and/or use the context of a transaction after one of steps 414 is performed. In this fashion, pre-step processing 520 and/or post-step processing 522 can be used to provide exception handling, rare events, or premium functionality that is not typically part of a transaction, including the creation of novel and highly-personalized server application behavior for at least some users.

H. Load Balancing

The decomposed server architecture 400 has been designed to scale with the number of users and traffic load. It allows for load balancing of traffic across multiple server devices and across step-based logic. One or more load balancers may facilitate this process. In general, a load balancer receives traffic from a source, selects a target from multiple possible targets, and routes the traffic to the selected target.

Figure 7:
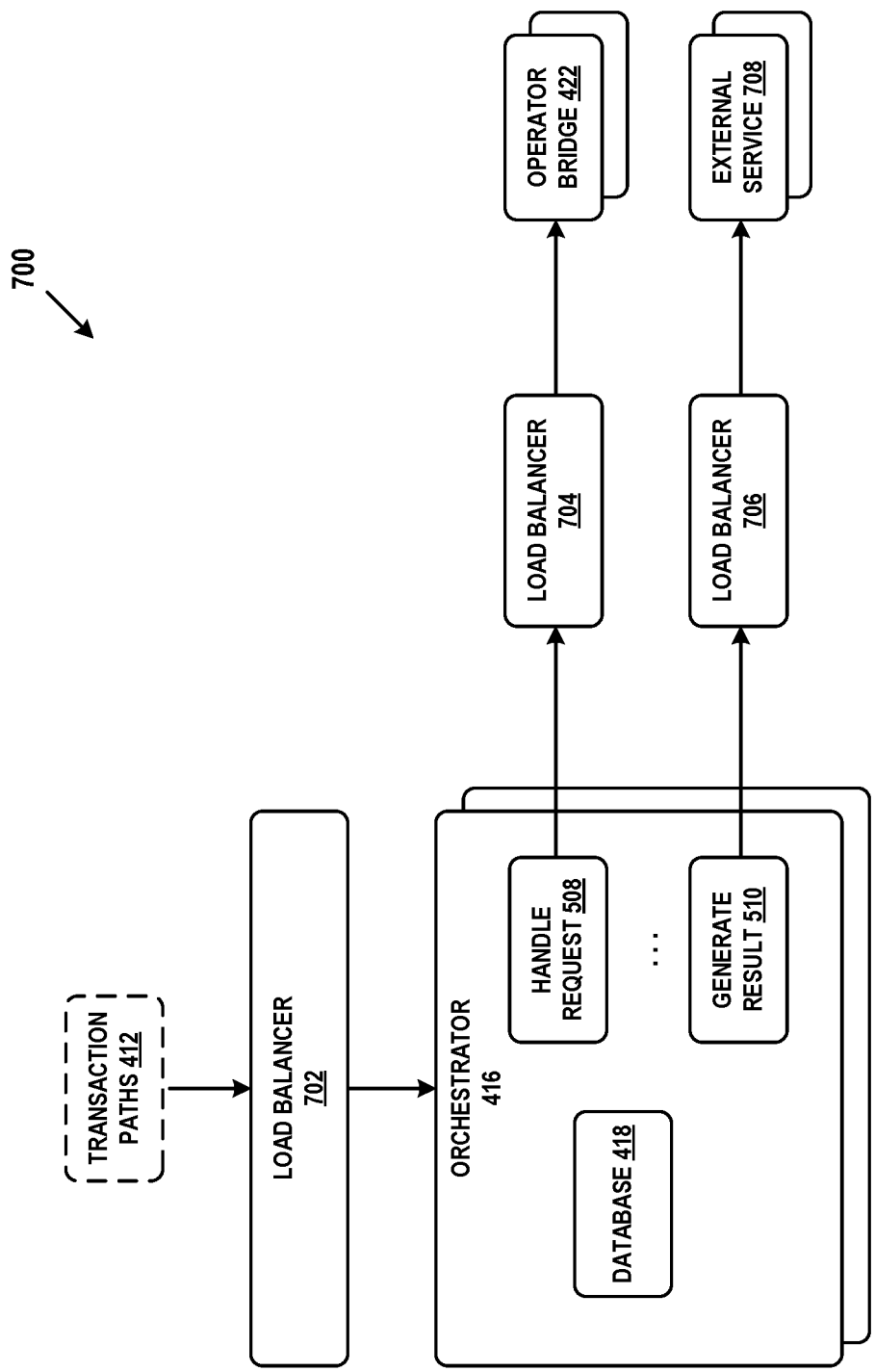
FIG. 7 provides an example of a decomposed server architecture with load balancers, in accordance with example embodiments.

FIG. 7 provides an example of decomposed server architecture 400 with strategically-located load balancers. Notably, load balancer 700 may be placed in front of two or more instances of orchestrator 416. This allows the execution of different transaction paths 412 to be spread across multiple orchestrators. Likewise, load balancer 704 may be placed between the instances of orchestrator 416 and two or more instances of operator bridge 422. This allows various steps 414 that may invoke operator bridge 422 (e.g., handle request 508 step as shown) to be spread across these instances of operator bridge 422. Similarly, load balancer 706 may be placed between the instances of orchestrator 416 and two or more instances of external service 708. This allows various steps 414 that may invoke external service 708 (e.g., generate result 510 step as shown) to be spread across these instances of external service 708. These are just examples and other possible load balancer arrangements exist, e.g., for more or fewer of steps 414.

These load balancers may employ various disciplines to determine a load-balanced target for incoming traffic. For example, round-robin (iteratively cycling through all targets), random (selecting a target based on a predetermined probability distribution), or hash-based (determining a target based on applying a hash function to part of the incoming traffic) load balancing may be used. Other disciplines may consider the size of the job to be carried out by the target, information from application metadata 408, information from operator metadata 410, and/or information from the context stored in database 418.

With this load balancing, a message from any of steps 414 that needs to be transmitted to another computing device or executing process can be sent to any one of a pool of such computing devices or executing processes for service. Since these external services are stateless, it does not matter which is selected. For example, the handle request 508 step can be routed to any instance of operator bridge 422.

Thus, each of steps 414 can use a load balancer and scale up with its traffic demand. The responsibility of performance resides with each step. The orchestrator 416 can scale up horizontally (horizontal scaling refers to increasing the capacity of a system by adding additional nodes, as opposed to increasing the capability of the existing nodes), and each step can also scale up horizontally. The result is an architecture and system that is highly scalable. Importantly, the performance of each area can be clearly monitored and identified, allowing for optimizations and performance improvements to be targeted to particular areas in need of improvement or otherwise forming a bottleneck. As example, a step of steps 414 that is the slowest in comparison to the others of steps 414 will be a candidate for performance improvement.

Additionally, once such a step is using a load balancer, it allows for adaptive scaling. A threshold can be set for the resource usage or processing time for a step. If this threshold is reached, then the load balancer technology can cause additional service capacity (e.g., more physical server devices, virtual servers, and/or software processes) to be added to the pool. This facilitates sharing the traffic across more services so that the desired performance is more likely to be achieved by the step. If the traffic volume reduces, the additional services can scaled down in a converse manner. As a result, automatically scaling up and down the performance of each step is possible.

It is also possible for an instance of an external service behind a load balancer to fail. In a simple example, the external service can crash and become unavailable. In this situation, the load balancer may be able to detect the failure (e.g., due to lack of a response to a message) and at least temporarily remove the failed instance from its load balancing targets. Orchestrator 416 can invoke the step again, and then the load balancer may direct the message to an instance of the external service that is still operational. This, effectively bypasses the failure and results in the continuation of the transaction path. The instance that failed can be restored back to health in its own time (and added back to the targets of the load balancer) without blocking any execution.

It has been a long-standing issue in multiple industries that when a new server application goes live, there can be huge volumes of user attempting to access and use the server application on the first few days after its release. This increase in traffic can be unpredictable, as server application may be more or less successful than expected. The result is that there may be an increase in latency of server application responses, as well as unresponsiveness to users.

Thus, in days soon after launch, there may be a need to seamlessly scale the transaction processing system without impacting any other server applications. Server applications should have consistent latency and performance for the users, irrespective of the volume of traffic. When designed as described herein, the transaction processing system can be scaled up and down with demand for any given transaction path or step. Such automatic scaling allows an improved and seamless user experience with reduced variability of latency.

I. Improved Loading Time

In reference to FIG. 4, loading time is defined from the point that a user selects a server application by way of operator web site 402 until the user can interact with this server application. When a server application is loading, the system carries out at least two tasks. First, it may verify that the user has permission to access the server application (e.g., by checking with one or more of location/geoblocking service 406, application metadata 408, and/or operator metadata 410). Second, it may retrieve any active state for this server application that is either stored in database 418 or elsewhere. This may not be the first time the user is accessing the server application and, as such, it may retrieve the state as of the time the user last accessed the server application. Obtaining this state is referred to herein as a "refresh" request. Such state may, for example, cause client device 300 to display a previous result relating to execution of the server application.

A long-standing problem is to reduce this loading time so that the user only waits as much time as needed. The longer the user waits, the more likely they are to exit client application 300A. Decomposed server architecture 400 addresses this issue.

When the user initially launches the server application, the operator can supply an authentication token as part of the URL of application launcher 404. This allows the transaction processing system to perform a server-to-server callback to the operator in order to validate that the user is permitted to launch and use this particular server application.

Application launcher 404 can invoke the session management 500 step to create a session for the user, and provide a unique session ID to operator web site 402. Application launcher 404 can then look up the application address (e.g., another URL) to use for this operator and server application from operator metadata 410. Application launcher 404 can then provide the application address to client application 300A so that client application 300A can start loading the server application content.

The callback to the operator is made to validate the player, but importantly, the server application can continue to load while the operator is responding. Once the server application is sufficiently loaded enough, it can perform a refresh request. The loading is only slowed down while checking, based on the authentication token, that the user is allowed to access the server application. Since the transaction path is responding to a refresh request, it can be optimized to respond quickly to the request. Parallelism achieved in this initial phase of loading a server application and authenticating with an operator is possible through new features provided by decomposed server architecture 400.

J. Security

Since the program logic of any of steps 414 can be outside of orchestrator 416, the program logic of such a step can also reside in a different virtual private cloud (VPC) from orchestrator 416. A VPC is a secure, isolated private cloud environment that can be hosted within a public cloud environment. It enables allocation and use of resources in a virtual network, including the selection of IP address ranges, creation of subnets, and configuration of routing tables and network gateways. A VPC can provide advanced security features such as security groups and network access control lists, which offer granular control over inbound and outbound traffic to and from individual resources. Additionally, VPCs support various virtualized and software-based resources, such as virtual machines, containers, and databases, and allow for scaling of resources according to demand.

Use of VPCs allows for greater control over the security of communications between steps 414 and external services. In the example of FIG. 4, operator bridge 422 and transaction database 426 can reside in different VPCs (perhaps the same VPCs as the steps by which they are respectively invoked). Thus, a new server application can be deployed without needing to modify the VPC where orchestrator 416 is disposed.

K. Reduction in Hardware Use

The hardware used in decomposed server architecture 400 can execute on cloud-based and/or virtualized technologies, for example Kubernetes. This can improve efficiencies over existing systems. Particularly, the computational cost for the hardware and software resources used in determining a result can be accurately measured. Currently, no system known is able to measure performance and resource costs this precisely.

The underlying resources used with any transaction path can be switched out for more cost-effective resources as needed. This is possible due to the flexibility and scalability of the system. Since the system can be scaled horizontally, there is a choice as to how many instances of orchestrator 416 and/or any of steps 414 are executing simultaneously. There could be a few instances running on high-power hardware resources (e.g., with faster processors and more memory), or more instances executing on lower-power hardware resources (e.g., with slower processors, and/or less memory).

Decomposed server architecture 400 is also highly flexible in terms of programming languages and database technologies used. This polyglot arrangement also allows for optimizations to reduce computational cost. For example, the choice of database technology can easily factor into the cost of transactions or steps. This flexibility is something not achieved with traditional (known) architectures.

L. Transaction Logging

Often the final step in in a transaction path 412, data from the transaction and context may be logged by log transaction 516 step to transaction database 426 (which could be based on, for example, Apache Kafka). Once this step has logged the data, it orchestrator 416 may provide the response to the client. This final step makes logging a high priority of a transaction path 412. Usually this is not the case and logging occurs separately, with a low priority, or not at all.

This logging of transaction data it allows other systems to receive the data in either near-real time or in batches. For server applications that require real-time monitoring (e.g., for correctness, stability, or performance purposes), they can receive the data needed and take action in an expedited fashion.

IV. Example Decomposed Web-Based Service

Figure 8:
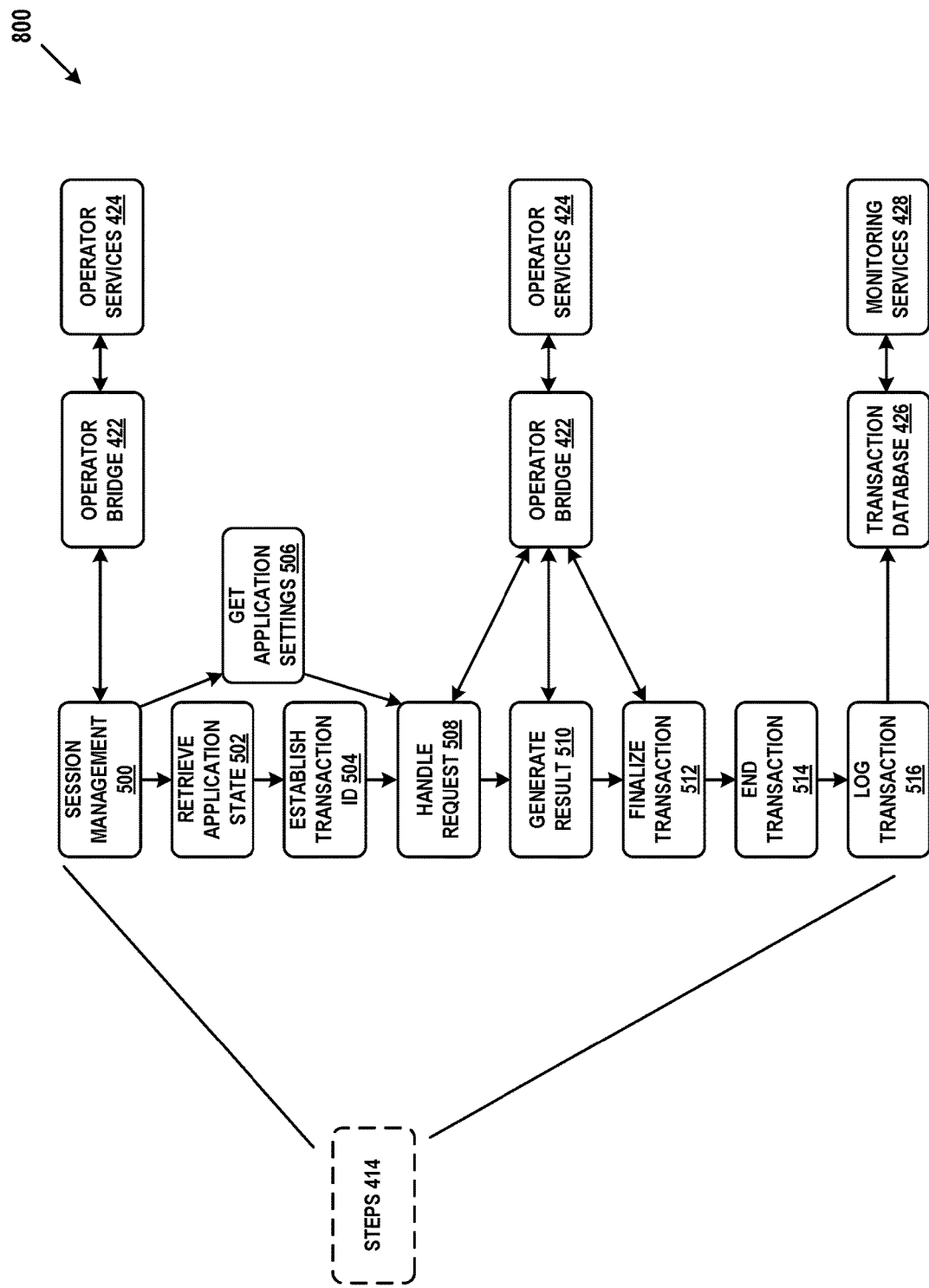
FIG. 8 depicts a decomposed web-based service architecture, in accordance with example embodiments.

FIG. 8 depicts a decomposed web-based service architecture 800 in line with the discussion above. Service architecture 800 could facilitate, for example, a storage services, a customer relationship management service, a videoconferencing service, a messaging service, a blogging service, or some other form of service. This is just one example of an application that can employ server architecture 400 for improved performance.

Thus, service architecture 800 may include some or all features of server architecture 400. Though not shown in FIG. 8, these can include software modules for operator web site 402, application launcher 404, location/geoblocking service 406, application metadata 408, operator metadata 410, and orchestrator 416.

Steps 414 of a transaction path 412 may include steps 500-516 as described above. Here, transaction path 412 indicates that get application settings 506 can be performed in parallel to retrieve application state 502 and establish transaction ID 504. All other of steps 500-516 are performed serially as shown by the arrows.

Session management 500 may interact with operator services 424 by way of operator bridge 422. For example, session management 500 may authenticate the account of a user attempting to access the web-based service. Similarly, handle request 508 may interact with operator services 424 by way of operator bridge 422 to provide representations of user requests to operator services 424, generate result 510 may interact with operator services 424 by way of operator bridge 422 to receive the results of user requests from operator services 424, and finalize transaction 512 may interact with operator services 424 by way of operator bridge 422 to confirm that the user has accepted these results.

As noted above, log transaction 516 may provide data, to transaction database 426, representing each transaction. Monitoring services 428 may obtain this data either in real-near time or as needed.

Service architecture 800 can take advantage of any of the features described above. As shown, it uses parallelism. It can employ roll-back and roll-forward features, e.g., with a boundary set between generate result 510 and finalize transaction 512. Various pre-processing and post-processing steps can be inserted before, after, and/or between the steps shown. Further, load balancing and loading time improvements are possible. Other advantages are also possible.

V. Example Operations

Figure 9:
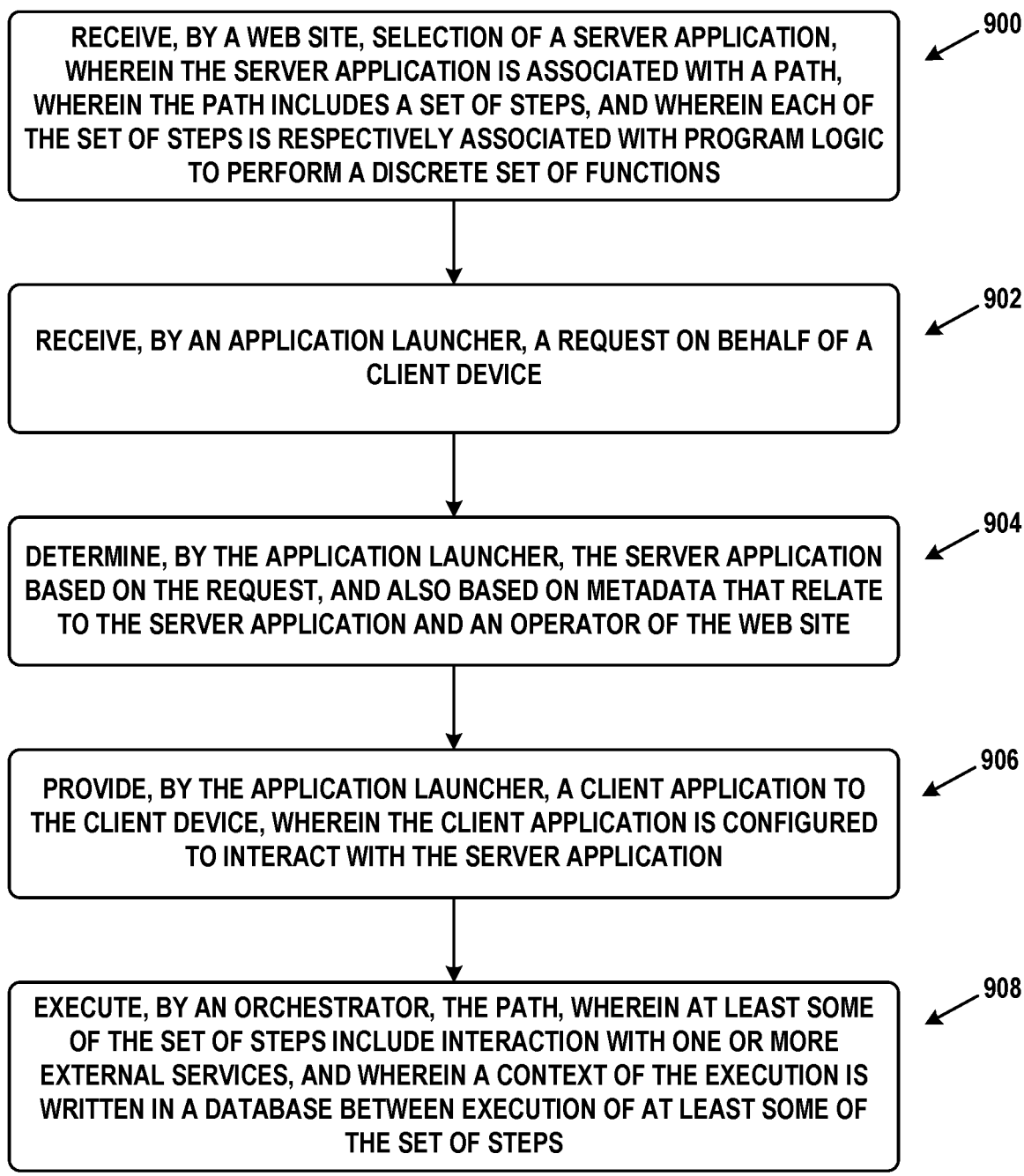
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve receiving, by a web site, selection of a server application, wherein the server application is associated with a path, wherein the path includes a set of steps, and wherein each of the set of steps is respectively associated with program logic to perform a discrete set of functions. Here, such a discrete set of functions are generally well-defined to perform specific tasks, may execute independently from one another, and may be implemented in separate blocks or units of program code.

Block 902 may involve receiving, by an application launcher, a request on behalf of a client device. This request may be from the client device by way of the web server. The request may also be from the same client device that selected the server application. For instance, the selection of the server device may cause the request to be provided to the application launcher.

Block 904 may involve determining, by the application launcher, the server application based on the request, and also based on metadata that relate to the server application and an operator of the web site.

Block 906 may involve providing, by the application launcher, a client application to the client device, wherein the client application is configured to interact with the server application.

Block 908 may involve executing, by an orchestrator, the path, wherein at least some of the set of steps include interaction with one or more external services, and wherein a context of the execution is written in a database between execution of at least some of the set of steps.

In some examples, the web site is also configured to allow selection of a second server application, wherein the second server application is associated with a second path, wherein the second path includes a second set of steps, wherein each of the second set of steps is respectively associated with second program logic to perform a second discrete set of functions, wherein the metadata also relates to the second server application, wherein the application launcher is also configured to: receive a second request from the client device, determine the second server application based on the second request and the metadata, and provide a second client application to the client device, wherein the second client application is configured to interact with the second server application, wherein the orchestrator configured to execute the second path, wherein at least some of the second set of steps include interaction with the one or more external services, and wherein a second context of the execution is written in the database between execution of at least some of the second set of steps.

In some examples, the software components further comprise a second web site configured to allow selection of a second server application, wherein the second server application is associated with a second path, wherein the second path includes a second set of steps, and wherein each of the second set of steps is respectively associated with second program logic to second perform a second discrete set of functions, wherein the metadata also relates to the second server application and a second operator of the second web site, wherein the application launcher is also configured to: receive a second request from the client device, determine the second server application based on the second request and the metadata, and provide a second client application to the client device, wherein the second client application is configured to interact with the second server application, wherein the orchestrator configured to execute the second path, wherein at least some of the second set of steps include interaction with the one or more external services, and wherein a second context of the execution is written in the database between execution of at least some of the second set of steps.

In some examples, providing the client application to the client device is based on determining, by way of a geolocation service, that the client device is permitted to access the server application.

In some examples, the client application is executable within a web browser of the client device.

In some examples, the set of steps include one or more of: session management, retrieving application state, establishing a path identifier, getting application settings, handling requests from the client device, generating results, finalizing execution of the path, ending execution of the path, or logging data relating to execution of the path.

In some examples, the path indicates that: at least two of the set of steps can be performed in parallel to one another, and a pair of steps in the set of steps are to be performed serially.

In some examples, a particular step of the set of steps has either pre-step processing or post-step processing defined thereof, wherein the pre-step processing occurs before execution of the particular step and is configured to modify the context, and wherein the post-step processing occurs after execution of the particular step and also is configured to modify the context.

In some examples, each of the set of steps is configured to execute independently of other steps of the set of steps.

In some examples, the path defines a boundary separating the set of steps into a first group of steps and a second group of steps, wherein the first group of steps are configured to be performed before the second group of steps, wherein a failure that occurs during execution of the first group of steps causes the context to be rolled back and the path to be restarted, and wherein a further failure that occurs during execution of the second group of steps causes at least some of the second group of steps to be retried.

Some examples may also include: a plurality of orchestrators, each configured to execute paths, wherein the orchestrator is one of the plurality of orchestrators; and a load balancer configured to distribute representations of the paths across the plurality of orchestrators according to a load balancing discipline.

In some examples, the plurality of orchestrators scales in number proportionally to orchestrator demand.

In some examples, a particular step of the set of steps is configured to interact with a particular external service of the one or more external services, wherein a plurality of server components are configured to perform the particular external service. These examples may further include a load balancer configured to distribute interactions across the plurality of server components according to a load balancing discipline.

In some examples, the plurality of server components scales in number proportionally to server component demand.

In some examples, the application launcher is configured to facilitate loading of the server application in parallel to determining whether a user associated with the client device is permitted to access the server application.

In some examples, the orchestrator and the one or more external services are hosted within different virtual private cloud systems.

In some examples, the context represents an intermediate or final state of the execution of the path.

In some examples, the orchestrator receives a representation of the path from the application launcher.

In some examples, at least some of the external services operate in a stateless fashion.

The features, alternative examples, and additional examples discussed in the context of FIG. 9 may be arranged in various combinations. In other words, any one or more of these alternative examples or additional examples can be selected for inclusion with blocks 900, 902, 904, 906, and 908.

VI. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    one or more processors; and
    memory storing instructions that are executable by the one or more processors to perform operations of software components comprising:
        a web site configured to allow selection of a server application, wherein the server application is associated with a path, wherein the path includes a set of steps, and wherein each of the set of steps is respectively associated with program logic to perform a discrete set of functions;

storage containing metadata that relate to the server application and an operator of the web site;

an application launcher configured to: receive a request on behalf of a client device, determine the server application based on the request and the metadata, and provide a client application to the client device, wherein the client application is configured to interact with the server application; and an orchestrator configured to execute the path, wherein at least some of the set of steps include interaction with one or more external services remotely accessible to the system, and wherein a context of the execution is written in a database between execution of at least some of the set of steps.

2. The system of claim 1, wherein the web site is also configured to allow selection of a second server application, wherein the second server application is associated with a second path, wherein the second path includes a second set of steps, wherein each of the second set of steps is respectively associated with second program logic to perform a second discrete set of functions, wherein the metadata also relates to the second server application, wherein the application launcher is also configured to: receive a second request from the client device, determine the second server application based on the second request and the metadata, and provide a second client application to the client device, wherein the second client application is configured to interact with the second server application, wherein the orchestrator configured to execute the second path, wherein at least some of the second set of steps include interaction with the one or more external services, and wherein a second context of the execution is written in the database between execution of at least some of the second set of steps.

3. The system of claim 1, wherein the software components further comprise:

a second web site configured to allow selection of a second server application, wherein the second server application is associated with a second path, wherein the second path includes a second set of steps, and wherein each of the second set of steps is respectively associated with second program logic to second perform a second discrete set of functions, wherein the metadata also relates to the second server application and a second operator of the second web site, wherein the application launcher is also configured to: receive a second request from the client device, determine the second server application based on the second request and the metadata, and provide a second client application to the client device, wherein the second client application is configured to interact with the second server application, wherein the orchestrator configured to execute the second path, wherein at least some of the second set of steps include interaction with the one or more external services, and wherein a second context of the execution is written in the database between execution of at least some of the second set of steps.

4. The system of claim 1, wherein providing the client application to the client device is based on determining, by way of a geolocation service, that the client device is permitted to access the server application.

5. The system of claim 1, wherein the client application is executable within a web browser of the client device.

6. The system of claim 1, wherein the set of steps include one or more of: session management, retrieving application state, establishing a path identifier, getting application settings, handling requests from the client device, generating results, finalizing execution of the path, ending execution of the path, or logging data relating to execution of the path.

7. The system of claim 1, wherein the path indicates that: at least two of the set of steps can be performed in parallel to one another, and a pair of steps in the set of steps are to be performed serially.

8. The system of claim 1, wherein a particular step of the set of steps has either pre-step processing or post-step processing defined thereof, wherein the pre-step processing occurs before execution of the particular step and is configured to modify the context, and wherein the post-step processing occurs after execution of the particular step and also is configured to modify the context.

9. The system of claim 1, wherein each of the set of steps is configured to execute independently of other steps of the set of steps.

10. The system of claim 1, wherein the path defines a boundary separating the set of steps into a first group of steps and a second group of steps, wherein the first group of steps are configured to be performed before the second group of steps, wherein a failure that occurs during execution of the first group of steps causes the context to be rolled back and the path to be restarted, and wherein a further failure that occurs during execution of the second group of steps causes at least some of the second group of steps to be retried.

11. The system of claim 1, further comprising:

a plurality of orchestrators, each configured to execute paths, wherein the orchestrator is one of the plurality of orchestrators; and a load balancer configured to distribute representations of the paths across the plurality of orchestrators according to a load balancing discipline.

12. The system of claim 11, wherein the plurality of orchestrators scales in number proportionally to orchestrator demand.

13. The system of claim 1, wherein a particular step of the set of steps is configured to interact with a particular external service of the one or more external services, wherein a plurality of server components are configured to perform the particular external service, the system further comprising:

a load balancer configured to distribute interactions across the plurality of server components according to a load balancing discipline.

14. The system of claim 13, wherein the plurality of server components scales in number proportionally to server component demand.

15. The system of claim 1, wherein the application launcher is configured to facilitate loading of the server application in parallel to determining whether a user associated with the client device is permitted to access the server application.

16. The system of claim 1, wherein the orchestrator and the one or more external services are hosted within different virtual private cloud systems.

17. The system of claim 1, wherein the context represents an intermediate or final state of the execution of the path.

18. The system of claim 1, wherein the orchestrator receives a representation of the path from the application launcher.

19. The system of claim 1, wherein at least some of the external services operate in a stateless fashion.

20. A computer-implemented method comprising:
- receiving, by a web site, selection of a server application, wherein the server application is associated with a path, wherein the path includes a set of steps, and wherein each of the set of steps is respectively associated with program logic to perform a discrete set of functions;
- receiving, by an application launcher, a request on behalf of a client device;
- determining, by the application launcher, the server application based on the request, and also based on metadata that relate to the server application and an operator of the web site;
- providing, by the application launcher, a client application to the client device, wherein the client application is configured to interact with the server application; and
- executing, by an orchestrator, the path, wherein at least some of the set of steps include interaction with one or more external services, and wherein a context of the execution is written in a database between execution of at least some of the set of steps.

* * * * *